INVENTOR
Jong-Dok Kim
BY Stiee & Stiee
ATTYS.

May 28, 1968 JONG-DOK KIM 3,385,598

PNEUMATIC FILING DEVICE

Filed June 9, 1966 2 Sheets-Sheet 2

INVENTOR
Jong-Dok Kim
BY Stiee & Stiee
ATTYS.

3,385,598

PNEUMATIC FILING DEVICE

Jong-Dok Kim, Munich, Germany, assignor to Siemens Aktiengesellschaft, Munich, Germany, a corporation of Germany Filed June 9, 1966, Ser. No. 556,382
Claims priority, application Germany, June 18, 1965, S 97,682
3 Claims. (Cl. 271—86)

ABSTRACT OF THE DISCLOSURE

A filing device used to file sheet-like record carriers such as punch cards which are used in a data processing machine. To prevent damage to the carrier while being placed into a compartment of a filing device, the carrier contacts a brake plate having a suction surface which is disposed over the compartment and stops the movement of the carrier. The filing device further includes either a mechanical or pneumatic mechanism to facilitate the release of the carrier from the plate.

The invention relates to a filing device for sheet-like record carriers. After the information contained on such record carriers has been read, the record carriers must be temporarily filed in one or more trays from which they can be removed, in the form of a stack or pile, following termination of the filing process. At present the high speeds of the modern data-processing devices likewise require higher and higher speeds in the mechanisms for supplying and receiving the carriers. When dealing with a sorting device, for example for punch cards, the increase in speed is obtained by increasing of the transport, and thus the pickup speed. Before filing, the record carriers must be braked in such a way that they are not damaged during the depositing thereof in the filing tray. If the speed is not too high and if the record carriers are relatively rigid, simple braking means may be employed. For example, it is known to provide a leaf spring, one end of which is resting on the stack. The transporting device feeds the record carriers between the stack and the spring, whereby a braking force is applied thereto. Another known method for slowing down of the record carriers consists of the feature to provide brake surfaces above the transportation path, said surfaces applying pressure to the record carriers and thereby delay them. The disadvantage of these known arrangements resides in the fact that they are not suitable for thin record carriers which are moved at high speed, because the mechanical means used in these arrangements do not insure sufficiently gentle handling of the record carriers.

It is, therefore, the purpose of the invention to provide an arrangement which does not possess the above mentioned disadvantages.

In the practice of the invention there may be utilized a brake plate, provided with openings, which is so arranged above a filing tray that the record carrier, due to its inertia, slides along the lower side of the brake plate, whereby the record carrier is drawn to the surface of the plate adjacent the openings, at least during the braking process, and in which further means are provided with strip the record carrier from the front surface of the brake plate, at least at the termination of the braking process.

In the drawings, wherein like reference characters indicate like or corresponding parts:

FIG. 2 illustrates the application of the invention to a sorting device or the like.

Figure 1:
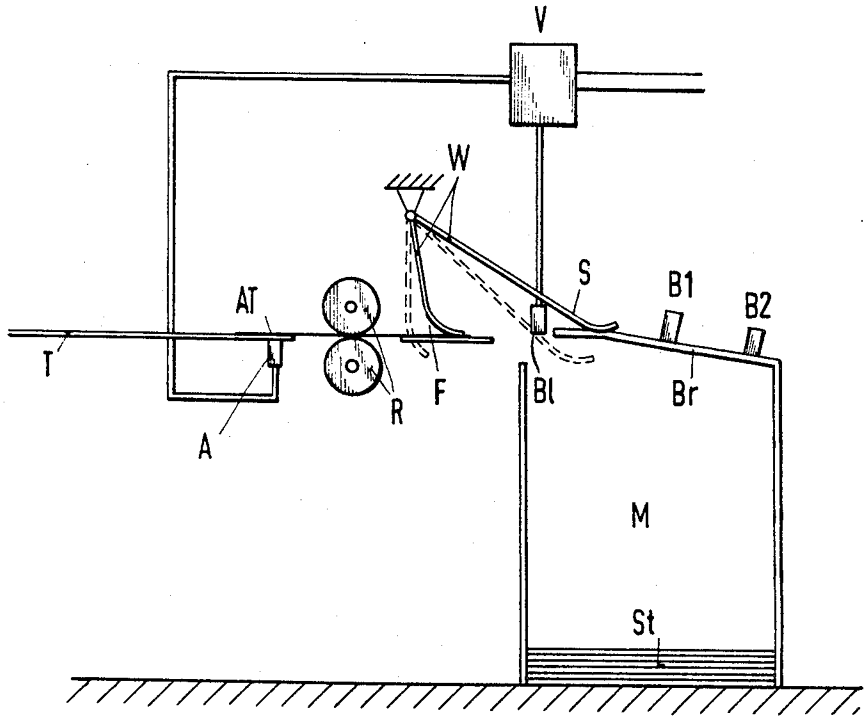
FIG. 1 is a side elevational view of a device embodying the invention.

FIG. 1 illustrates the filing tray M in which stack St is formed. A brake plate B*r* is so arranged above the filing tray M that its surface facing the transport path T is located above such transport path. Two brake nozzles or orifices B1 and B2 are located in the back or inner part of the brake plate B*r*, through which air is withdrawn to the exterior so that an area of low pressure results below the back or inner part of the brake plate adjacent the nozzle openings. Several roller pairs R, only one of which pair is illustrated, transport the record carrier AT along the transport path. Above the transport path, an angle-shaped lever W is provided, which is suitably supported for pivotal movement and comprises an impact lever S and a sensing lever part F. In the rest state, the free end of sensing lever F is located in front of the roller pair R and extends below the transport path which is provided with a recess through which lever F can drop into its rest position. Lever S, operating as an impact lever, is rigidly connected with lever F. It is so proportioned that its free end extends across the front edge of the filing tray M, whereby, when a record carrier is moved along the transport path in the direction of the filing tray, its front edge strikes the sensing lever F and lifts it up since the record carrier is at this time supported by a base. The end of the impact lever is now positioned above the front edge of the brake sheet, as illustrated in solid lines in FIG. 1. Due to its inertia, the record carrier slides along the lower surface of the brake sheet at the speed provided by the roller pair R. The low pressure there prevailing results in a pressing of the front or leading portion of the record carrier against the surface of the brake plate so that, due to the friction created, the record carrier comes to a dead stop and adheres to the brake plate. The back or trailing part of the record carrier hangs down somewhat and, together with the brake plate, forms a gap or split which diverges rearwardly. Impact lever S promotes the formation of the split by dropping down from above, with its free end striking the adjacent end of the record carrier. The inertia momentum of the angle lever is so proportioned that, due to the energy inherent in the record carrier, it is provided with such a pivotal acceleration that the impact lever drops down onto the back edge of the record carrier approximately when the advancing moment of said record carrier has ceased. The next record carrier is then advanced into the split formed by the brake plate and the preceding record carrier, and detaches the latter from the brake plate, with such record carrier subsequently falling into filing tray M.

In a further advantageous development of the invention, a pneumatic system for promotion of the split effect is provided in place of the lever system. This system employs a sensing orifice or nozzle A which is located on the transportation path and is temporarily covered by a passing record carrier with the sensing orifice being connected with pneumatic valve means, for example a 3-way valve V.

Adjacent the front edge of the brake plate, there is provided an air-discharge nozzle B1 which urges the back edge of the record carrier downward. The discharge nozzle is controlled through the pneumatic valve means by the sensing orifice A in such a way that the air discharge at the nozzle B1 is operative only when the record carrier is approximately at a standstill. For example, when the card or carrier following the carrier engaged on the brake plate has uncovered the nozzle A by moving through the rolls R, the uncovered nozzle actuates a valve V which connects a supply of air to be discharged from the nozzle B1 to urge the back edge of the engaged carrier downward away from the surface of the plate B*r*. Advantageously, the discharge nozzle is not located in the brake plate itself, but at some distance therefrom, since the air discharged below the plate also creates a certain suction effect. In the further development of the invention, the means for urging the record carrier away from the front edge of the brake plate can be dispensed with. In this case, following termination of the braking process, air can be discharged through special openings adjacent the brake plate, against the record carrier to detach the same from the brake plate.

Figure 2:
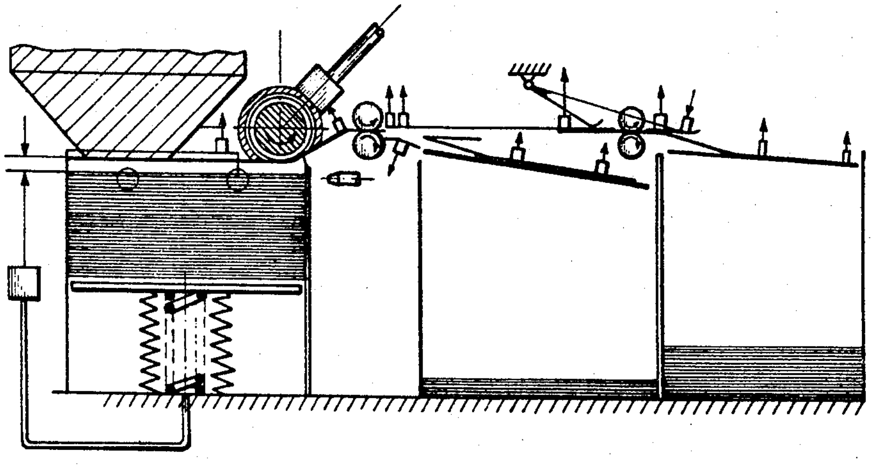

FIG. 2 illustrates the application of the invention to a machine, for example, a sorting machine wherein the record carrier may be deposited in either of several filing trays. In the example illustrated, the record carriers are initially disposed in a stack within a container suitably constructed to maintain the top sheet of the stack at a predetermined elevation, from which it is withdrawn by roller means. Numerous nozzles or orifices for the withdrawal or discharge of air are utilized, the direction of air flow being indicated by arrows associated therewith. Thus the leading edge portion of the top sheet of the stack is drawn upwardly by air withdrawal nozzle positioned thereabove into engagement with the discharge roller, a similar nozzle being disposed at the opposite side of the roller to raise the edge of the record carrier for engagement between two feed rollers. Three air withdrawal nozzles are disposed at the discharge side of the rollers, two being disposed above the transport path and one therebelow. The latter nozzle is operative to draw the leading edge portion of the record carrier downwardly, whereby the carrier may be deposited in the first tray, while the other two nozzles are operative to maintain the leading edge portion of the carrier in elevated position for transport to the next tray. Both trays are provided with a respective brake plate and air withdrawal orifice, similar to those illustrated in FIG. 1. Associated with the second tray is a similar angle-shaped lever, additional feed rollers, and respective air nozzles or orifices for controlling the movement of the record carrier in accordance with the desired operation. By suitable control of the various air nozzles a record carrier can be deposited in either tray, the carrier being effectively braked in the manner heretofore described.

Changes may be made within the scope and spirit of the appended claims which define what is believed to be new and desired to have protected by Letters Patent.

I claim:

1. A filing device for sheet-like record carriers movable at high speed along a transport path, by means of transport rollers, into a filing compartment, comprising a brake plate disposed above the filing compartment and arranged for engagement with a record carrier entering the filing compartment, with such record carrier sliding along the lower surface of said plate, said plate having openings therein for the withdrawal of air from the area immediately below said plate at least during the braking operation, whereby a record carrier entering the compartment will be drawn into contact with the adjacent plate surface to apply braking forces to arrest the record carrier, and means disposed adjacent the front edge of the brake plate for stripping the record carrier from such front edge, at least at the end of the braking operation.

2. A filing device according to claim 1, wherein said stripping means comprises a shiftable angle lever having a relatively long lower portion, the free end of which is disposed, in the rest position of the angle lever, adjacent the brake plate and adapted to press upon a record carrier engaged with such plate, and having a relatively short lever portion, the free end of which is disposed in the record carrier transport path, and adapted to be shifted by a record carrier moving along such path.

3. A filing device according to claim 1, wherein said stripping means comprises at least one air-discharge nozzle disposed adjacent the front edge of the brake plate, operative to blow air on a record carrier when the latter is within the filing compartment adjacent said brake plate, and a sensing orifice disposed on the transport path, for controlling the discharge of air from said air-discharge nozzle.

References Cited

UNITED STATES PATENTS 3,328,027 6/1967 Schmidtke ----------- 271—74

RICHARD E. AEGERTER, *Primary Examiner.*